United States Patent
Lee

(10) Patent No.: US 10,014,741 B2
(45) Date of Patent: Jul. 3, 2018

(54) INSULATOR AND MOTOR HAVING THE SAME

(71) Applicant: LG INNOTEK CO., LTD., Seoul (KR)

(72) Inventor: Seong Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 188 days.

(21) Appl. No.: 15/196,767

(22) Filed: Jun. 29, 2016

(65) Prior Publication Data
US 2017/0005538 A1 Jan. 5, 2017

(30) Foreign Application Priority Data
Jun. 30, 2015 (KR) .................. 10-2015-0093323

(51) Int. Cl.
| | |
|---|---|
| *H02K 1/00* | (2006.01) |
| *H02K 3/34* | (2006.01) |
| *H02K 3/52* | (2006.01) |
| *H02K 1/04* | (2006.01) |
| *H02K 1/14* | (2006.01) |

(Continued)

(52) U.S. Cl.
CPC ............ *H02K 3/345* (2013.01); *H02K 1/04* (2013.01); *H02K 1/14* (2013.01); *H02K 1/185* (2013.01); *H02K 3/18* (2013.01); *H02K 3/522* (2013.01); *H02K 15/10* (2013.01); *H02K 3/325* (2013.01); *H02K 2203/12* (2013.01)

(58) Field of Classification Search
CPC ...... H02K 2203/12; H02K 3/345; H02K 3/50; H02K 3/52; H02K 3/522; H02K 3/30
USPC .................. 310/71, 194, 179–189
See application file for complete search history.

(56) References Cited

U.S. PATENT DOCUMENTS

| | | | | |
|---|---|---|---|---|
| 7,382,075 B2 * | 6/2008 | Wang | ............ | H02K 3/522 |
| | | | | 310/179 |
| 2005/0236921 A1 * | 10/2005 | Yoneda | ............ | H02K 3/522 |
| | | | | 310/179 |

(Continued)

FOREIGN PATENT DOCUMENTS

| | | |
|---|---|---|
| DE | 102010064051 A1 | 6/2012 |
| DE | 102011077980 A1 | 12/2012 |

(Continued)

OTHER PUBLICATIONS

European Search Report dated Nov. 22, 2016 in European Application No. 16177091.2.

*Primary Examiner* — Thanh Lam
(74) *Attorney, Agent, or Firm* — Saliwanchik, Lloyd & Eisenschenk

(57) ABSTRACT

Disclosed is an insulator of a motor, including a first side wall portion and a second side wall portion in which a coil is wound on outsides thereof, and which are disposed to face each other, to form an accommodation space at insides thereof, and also to form an entrance portion through which a stator is inserted; a connecting portion integrally formed with the first side wall portion and the second side wall portion; and a clip portion formed to protrude from at least one of an end of the first side wall portion and an end of the second side wall portion, and disposed at the entrance portion. Therefore, assemblability of the insulator with the stator can be ensured, and a manufacturing cost and a manufacturing time can be reduced.

14 Claims, 6 Drawing Sheets

(51) Int. Cl.
   *H02K 1/18*      (2006.01)
   *H02K 3/18*      (2006.01)
   *H02K 15/10*     (2006.01)
   *H02K 3/32*          (2006.01)

(56)              References Cited

U.S. PATENT DOCUMENTS

| | | | |
|---|---|---|---|
| 2006/0022550 A1* | 2/2006 | Otsuji | H02K 3/325 |
| | | | 310/194 |
| 2008/0024029 A1* | 1/2008 | Shiono | H02K 3/522 |
| | | | 310/194 |
| 2008/0106161 A1* | 5/2008 | Matsuzaki | H02K 3/524 |
| | | | 310/71 |
| 2009/0127971 A1* | 5/2009 | Ishizeki | H02K 3/522 |
| | | | 310/216.074 |
| 2010/0244597 A1* | 9/2010 | Sugiyama | H02K 3/522 |
| | | | 310/71 |
| 2011/0221297 A1 | 9/2011 | Langford et al. | |
| 2012/0286593 A1* | 11/2012 | Yokogawa | H02K 1/278 |
| | | | 310/43 |
| 2015/0137639 A1 | 5/2015 | Gomyo et al. | |

FOREIGN PATENT DOCUMENTS

| | | |
|---|---|---|
| DE | 102011083058 A1 | 3/2013 |
| FR | 2995470 A1 | 3/2014 |

\* cited by examiner

INSULATOR AND MOTOR HAVING THE SAME

CROSS-REFERENCE TO RELATED APPLICATION

This application claims priority under 35 U.S.C. § 119 to Korean Patent Application No. 2015-0093323, filed Jun. 30, 2015, the disclosure of which is incorporated herein by reference in its entirety.

BACKGROUND

Field of the invention

The present invention elates to an insulator and a motor having the same.

Discussion of Related Art

A motor includes a shaft which is rotatably formed, a rotor which is coupled to the shaft, and a stator which is fixed inside a housing, and the stator is installed along a circumference of the rotor to be spaced apart at a predetermined interval. And a coil which forms a rotating magnetic field is wound on the stator, causes an electric interaction with the rotor, and thus induces rotation of the rotor.

The stator may include a plurality of stator cores, and the stator core may be formed by stacking a steel plate including a plurality of teeth. A winding space is formed between the teeth, and the coil is wound on each of the teeth. At this point, an insulator is installed at the teeth, and insulates the coil and the stator cores.

Typically, the insulator may be formed by coupling two parts divided into an upper insulator and a lower insulator which are coupled to each other, or a plurality of parts more than 2 to each other.

However, in manufacturing the plurality of parts, the insulator having such a configuration has a problem that a manufacturing time and a manufacturing cost are increased due to a mold, an assembly apparatus or the like. Also, there is another problem that the manufacturing time and the manufacturing cost are increased due to addition of a manufacturing and assembling process.

BRIEF SUMMARY

The present invention is directed to an insulator which is configured with a single part, and a motor having the same.

Additional aspects of the invention will be set forth in part in the description which follows and, in part, will be obvious from the description, or may be learned by practice of the invention.

According to an aspect of the present invention, there is provided an insulator of a motor, including a first side wall portion and a second side wall portion in which a coil is wound on outsides thereof, and which are disposed to face each other, to form an accommodation space at insides thereof, and also to form an entrance portion through which a stator is inserted; a connecting portion integrally formed with the first side wall portion and the second side wall portion; and a clip portion formed to protrude from at least one of an end of the first side wall portion and an end of the second side wall portion, and disposed at the entrance portion.

The clip portion may be formed to protrude toward the inside of the first side wall portion or the inside of the second side wall portion, and may include a stepped surface which is in contact with an upper surface or a lower surface of the stator.

The stepped surface may be formed horizontally.

The clip portion may include an inclined surface which guides an insertion of the stator.

A first coil seating groove may be concavely formed at a winding surface formed at a surface of the first side wall portion and a winding surface formed at a surface of the second side wall portion so that the coil is seated on the first coil seating groove.

The clip portion may include a second coil seating groove which is formed to be continued with the first coil seating groove.

The connecting portion may be formed at an upper end of the first side wall portion and an upper end of the second side wall portion, and the entrance portion may be formed at a lower end of the first side wall portion and a lower end of the second side wall portion.

The insulator may further include an inner wall portion and an outer wall portion, and the inner wall portion may be formed inside the upper end of the first side wall portion and the upper end of the second side wall portion, and the outer wall portion may be formed outside the upper end of the first side wall portion and the upper end of the second side wall portion.

According to another aspect of the present invention, there is provided a motor including a rotating shaft; a rotor configured to surround the rotating shaft; and a stator disposed outside the rotor, wherein the stator includes a coil and an insulator on which the coil is wound, and the insulator includes a first side wall portion and a second side wall portion disposed to face each other, to form an accommodation space surrounding the stator, and also to form an entrance portion through which the stator is inserted, a connecting portion integrally formed with the first side wall portion and the second side wall portion, and a clip portion formed to protrude from at least one of an end of the first side wall portion and an end of the second side wall portion, and disposed at the entrance portion.

The stator may include a fitting groove which is formed at each of teeth and disposed in a height direction thereof and a fitting protrusion which protrudes convexly and is fitted to and inserted into the fitting groove may be formed at at least one of an inner surface of the first side wall portion and an inner surface of the second side wall portion.

The clip portion may be formed to protrude toward an inside of the first side wall portion or an inside of the second side wall portion, and may include a stepped surface which is in contact with an upper surface or a lower surface of the stator.

The clip portion may include an inclined surface which guides an insertion of the stator.

A first coil seating groove may be concavely formed at a winding surface formed at a surface of the first side wall portion and a winding surface formed at a surface of the second side wall portion so that the coil is seated on the first coil seating groove.

The clip portion may include a second coil seating groove which is formed to be continued with the first coil seating groove.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Exemplary embodiments of the present invention will be described in detail below with reference to the accompanying drawings. Objects, particular advantages and novel characteristics of the present invention will be more apparent from the following detailed description and preferred embodiments in connection with the accompanying drawings. And it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. And if it is considered that the specific description of the related and noticed functions or structures may obscure the gist of the present invention, the specific description will be omitted.

Terms including ordinal numbers such as "first," "second," etc. can be used to describe various components, but the components are not limited by those terms. The terms are used merely for the purpose of distinguishing one component from another. For example, a first component may be called a second component, and similarly, a second component may be called a first component without departing from the scope of rights of the invention. The term "and/or" encompasses combinations of a plurality of items or any one of the plurality of items.

Figure 1:
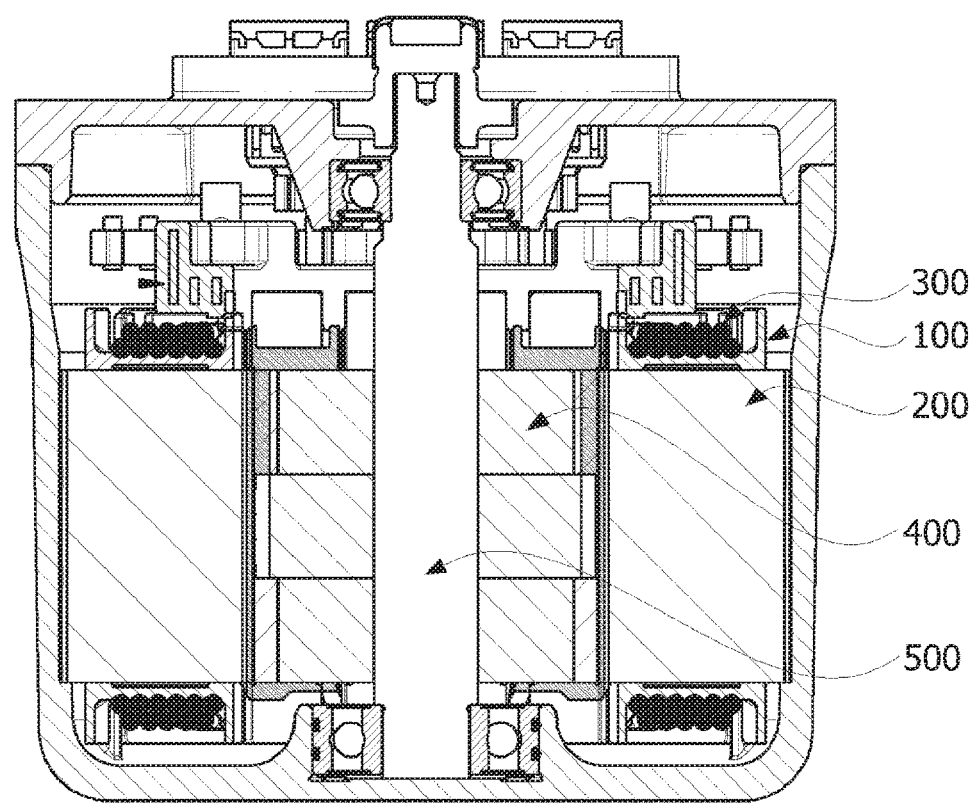
FIG. 1 is a view illustrating a motor according to an embodiment.

FIG. 1 is a view illustrating a motor according to an embodiment.

Referring to FIG. 1, a motor according to an embodiment of the present invention may include an insulator 100, a stator 200, a coil 300, a rotor 400 and a rotating shaft 500.

The insulator 100 serves to insulate the coil 300 and the stator 200 from each other, thereby preventing an electric current from being applied from one of the coil 300 and the stator 200 to the other. The insulator 100 may be formed of a resin material.

The stator 200 may be formed by stacking a plurality of steel plates each of which includes an annular yoke, and teeth which are disposed along a circumferential direction thereof so as to protrude in a direction of a radius inside of the yoke at equiangular intervals. The coil 300 which forms a rotating magnetic field may be wound on the tooth portion. At this point, the stator 200 and the coil 300 may be insulated from each other through the insulator 100.

The rotor 400 is disposed inside the stator 200. The rotor 400 may be formed by coupling a magnet to a rotor core, and if necessary, the rotor core and the magnet may be integrally formed with each other. Also, the rotor 400 may be formed in a type in which the magnet is coupled to an outer circumferential surface of the rotor core, or in which the magnet is inserted into a pocket of the rotor core. A sensing magnet for obtaining location information of the rotor 400 may be installed at an upper side of the rotor 400 in a coupled state to a plate, or a similar rotor location detecting means may be installed at the upper side of the rotor 400.

When an electric current is applied to the coil 300 wound on the stator 200, an electric interaction with the rotor 400 is caused, and thus rotation of the rotor 400 is induced. When the rotor 400 is rotated, the rotating shaft 500 is also rotated, and power is provided.

Figure 2:
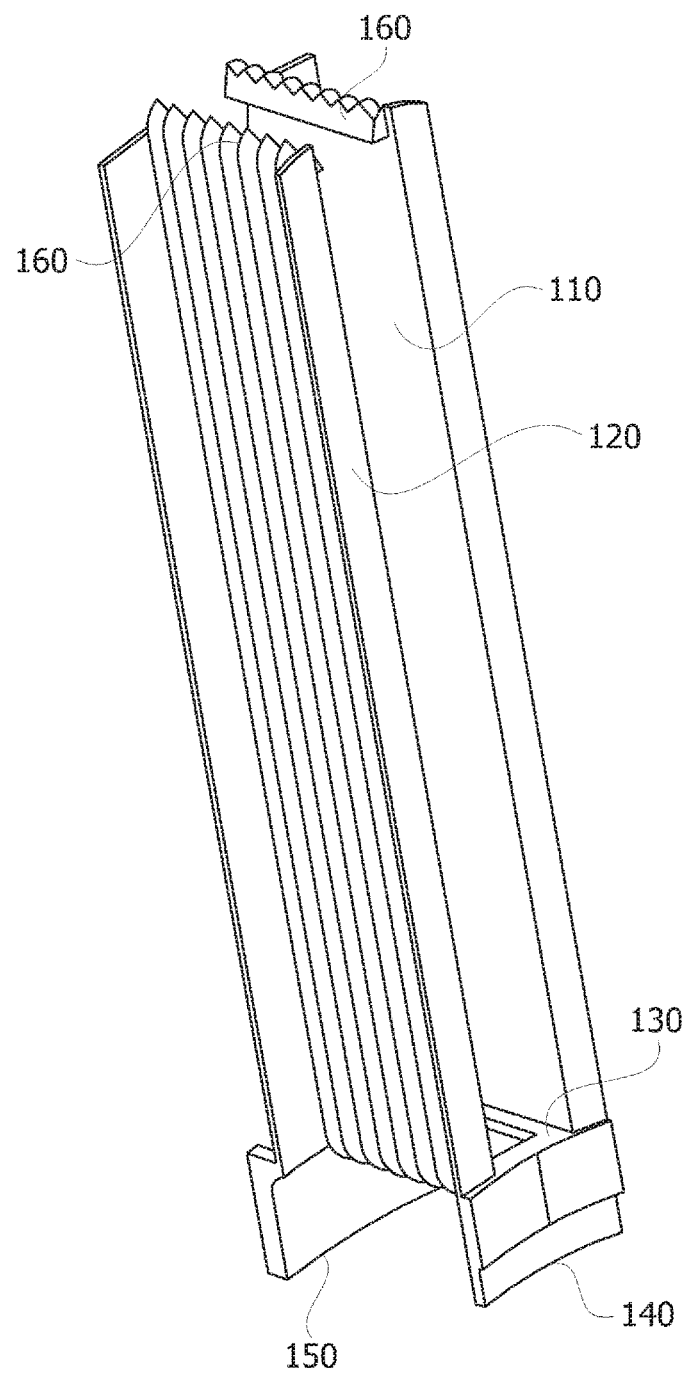
FIG. 2 is a view illustrating an insulator of the motor illustrated in FIG. 1.
Figure 3:
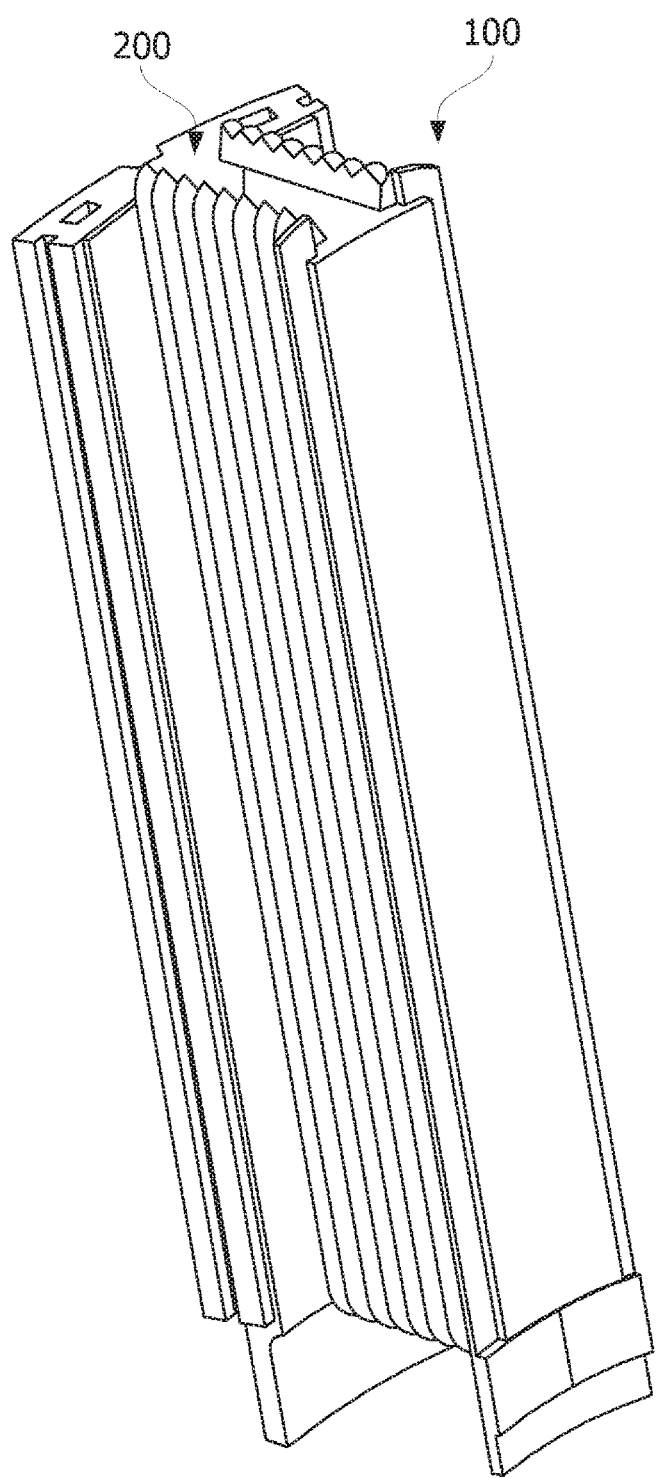
FIG. 3 is a view illustrating teeth of a stator at which the insulator illustrated in FIG. 2 is installed.

FIG. 2 is a view illustrating the insulator of the motor illustrated in FIG. 1, and FIG. 3 is a view illustrating the teeth of the stator at which the insulator illustrated in FIG. 2 is installed. FIGS. 2 and 3 clearly illustrate only a main characteristic portion to clearly understand a concept of the embodiment. As a result, various modifications of the drawings may be expected, and the scope of the present invention is not limited to a certain shape illustrated in the drawings.

Referring to FIGS. 2 and 3, the insulator 100 may include a first side wall portion 110, a second side wall portion 120, a connecting portion 130, an inner wall portion 140, an outer wall portion 150 and a clip portion 160. The first side wall portion 110, the second side wall portion 120, the connecting portion 130, the inner wall portion 140, the outer wall portion 150 and the clip portion 160 are separated according shapes and functional characteristics thereof, but are a single part in which they are connected to each other and integrally formed.

Figure 4:
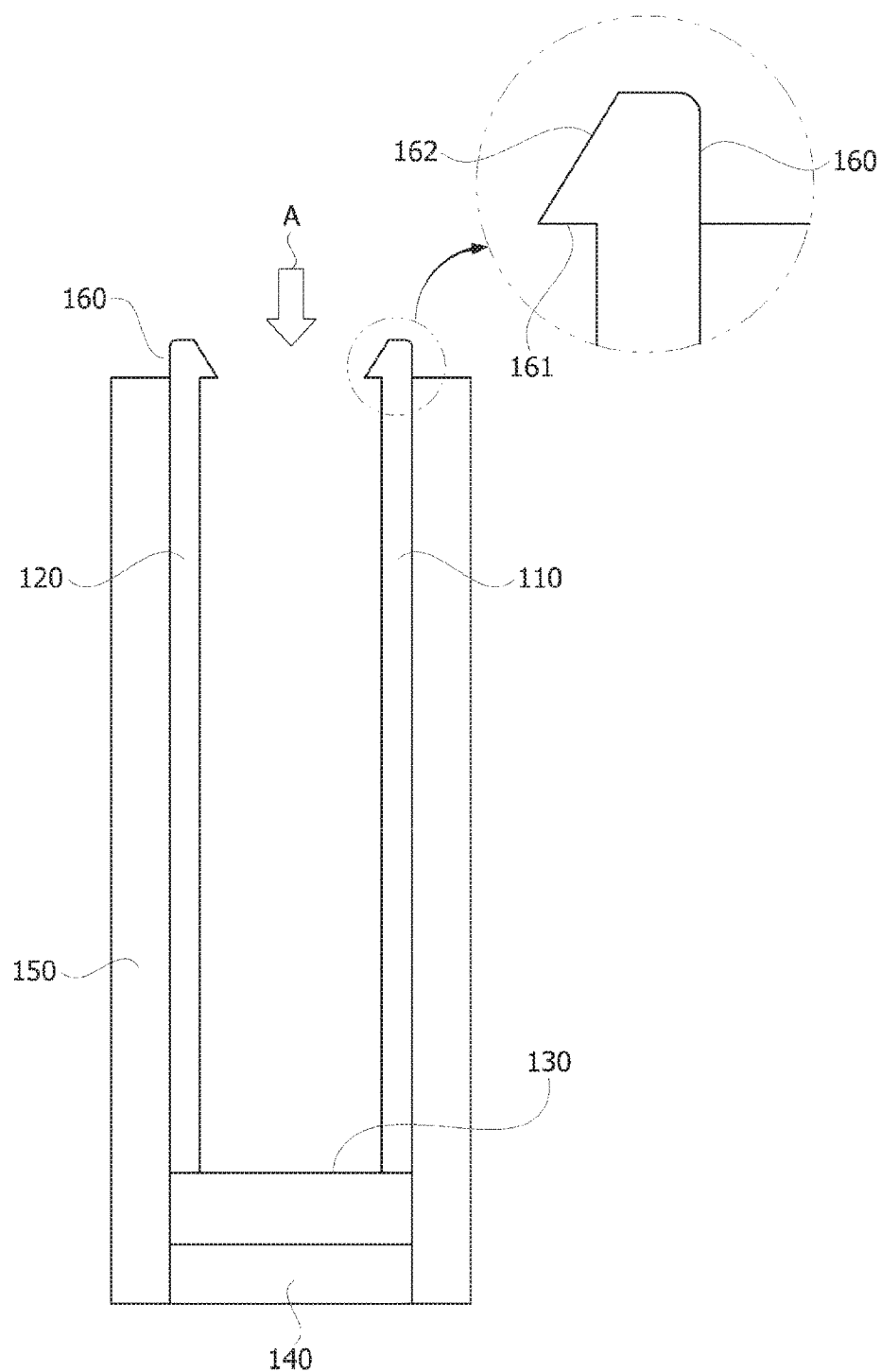
FIG. 4 is a front view of the insulator illustrated in FIG. 3.

FIG. 4 is a front view of the insulator illustrated in FIG. 3.

Referring to FIGS. 3 and 4, the first side wall portion 110 and the second side wall portion 120 are disposed to be spaced apart from each other and also to face each other. Outer surfaces of the first side wall portion 110 and the second side wall portion 120 are areas on which the coil 300 is wound, and inner surfaces thereof are areas which are in contact with the teeth of the stator 200 and surround the stator 200.

An accommodation space which surrounds the stator 200 is formed between the first side wall portion 110 and the second side wall portion 120.

Based on a lengthwise direction of the first side wall portion 110 or a lengthwise direction of the second side wall portion 120, the connecting portion 130 may be disposed at an upper end of the first side wall portion 110 and an upper end of the second side wall portion 120, and may form an ceiling of the accommodation space. However, a lower end of the first side wall portion 110 and a lower end of the second side wall portion 120 may be opened, and may form an entrance portion.

The accommodation space formed by the first side wall portion 110, the second side wall portion 120 and the connecting portion 130 may be generally formed in a pocket shape so that the stator 200 is installed therein.

Based on a radial direction centering on the rotating shaft 500 of the motor, the inner wall portion 140 may be disposed at an inside of the first side wall portion 110 and the second side wall portion 120, and the outer wall portion 150 may be disposed at an outside thereof.

And the clip portion 160 may be formed at the lower end of the first side wall portion 110 and the lower end of the second side wall portion 120 which form the entrance portion.

The clip portion 160 serves to fix the teeth of the stator 200 which are inserted in an A direction of FIG. 4. The clip portion 160 may be formed to protrude inside the lower end of the first side wall portion 110 and the lower end of the second side wall portion 120. Specifically, the clip portion 160 may include a stepped surface 161 which is in contact with upper surfaces or lower surfaces of the teeth of the stator 200 installed at the insulator 100 and fixes the stator 200.

The stepped surface 161 may be horizontally formed to be in close contact with the upper surfaces or the lower surfaces of the teeth of the stator 200.

And the clip portion 160 may include an inclined surface 162. The inclined surface 162 serves to guide the teeth of the stator 200 inserted in the A direction of FIG. 4 to be easily inserted into the accommodation space of the insulator 100. The inclined surface 162 may be formed to be inclined and thus to form an angle of attack in the A direction of FIG. 4.

The first side wall portion 110 and the second side wall portion 120 may be disposed in the form of a cantilever centering on the connecting portion 130, and thus may be formed to be elastically deformed. Therefore, the clip portion 160 formed at the first side wall portion 110 and the second side wall portion 120 is spread by an insertion force of the teeth of the stator 200 through the entrance portion, then returned to its original location after the teeth of the stator 200 is installed at the insulator 100, and presses the teeth, and thus fixes the insulator 100 to the stator 200.

Due to the clip portion 160, the insulator 100 may be manufactured as a single part, and the stator 200 and the insulator 100 may be assembled in a single operation in which the insulator 100 is pushed in the teeth of the stator 200.

Figure 5:
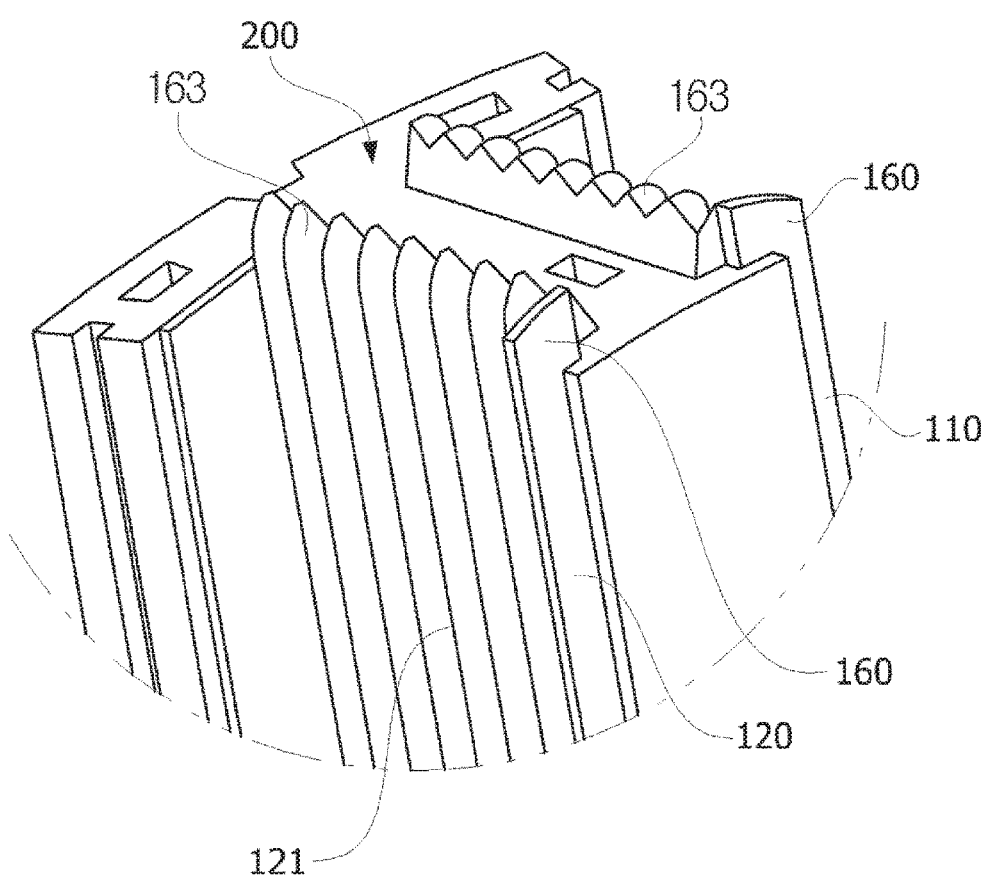
FIG. 5 is a view illustrating a first coil seating groove and a second coil seating groove.

FIG. 5 is a view illustrating a first coil seating groove and a second coil seating groove.

Referring to FIGS. 3 and 5, first coil seating grooves 111 and 121 in which the coil 300 is seated may be concavely formed at winding surfaces formed at the outer surfaces of the first side wall portion 110 and the second side wall portion 120, respectively. And a second coil seating groove 163 which is continued with each of the first coil seating grooves 111 and 121 may also be concavely formed at the clip portion 160.

The first coil seating grooves 111 and 121 and the second coil seating groove 163 serve to guide a winding operation of the coil 300. A size of each of the first coil seating grooves 111 and 121 and the second coil seating groove 163, a distance therebetween, and the number thereof may be set differently according to a diameter of the coil 300 and the winding number thereof.

The coil 300 which is wound in the first coil seating grooves 111 and 121 passes the second coil seating groove 163 formed at the first side wall portion 110, and is wound in the second coil seating groove 163 formed at the second side wall portion 120. At this point, due to a thickness of the clip portion 160 based on the radial direction centering on the rotating shaft 500 of the motor, a sufficient distance is ensured so that the coil 300 passing the clip portion 160 and the upper surfaces or the lower surfaces of the teeth of the stator 200 installed at the insulator 100 are not in contact with each other.

Figure 6:
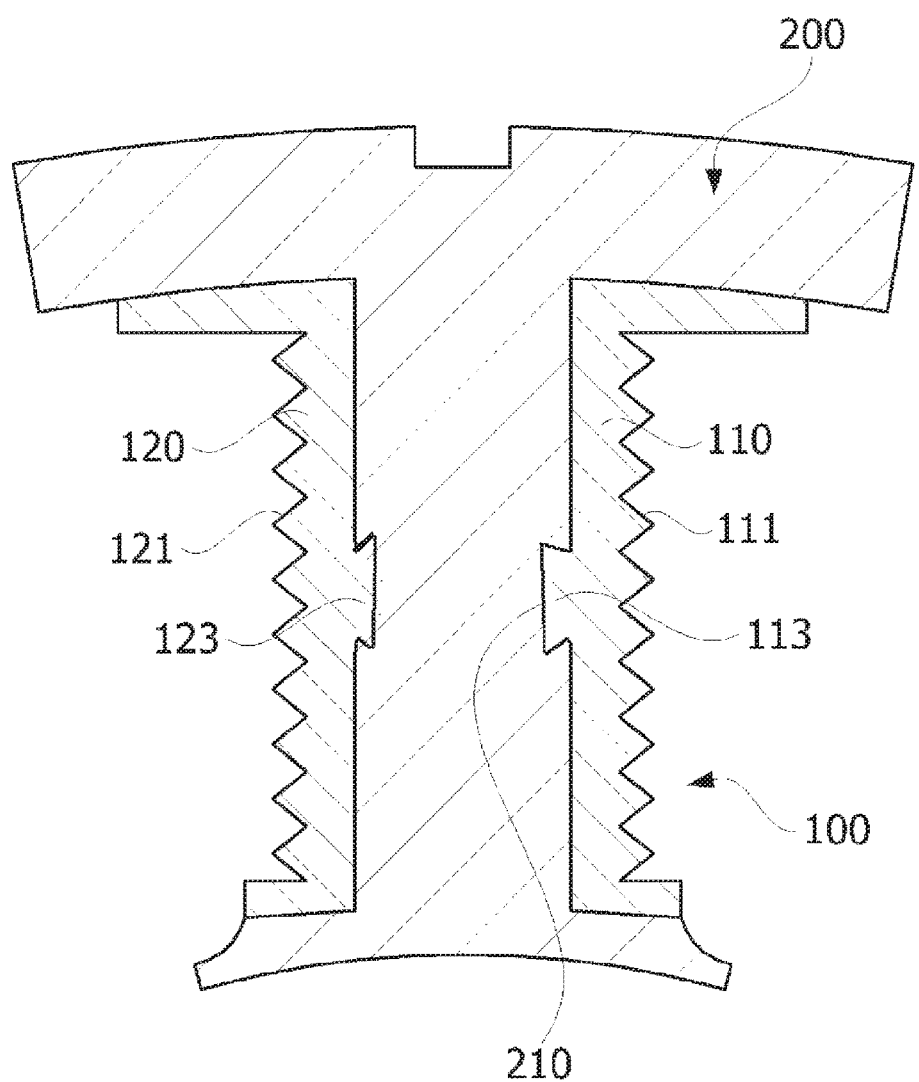
FIG. 6 is a view illustrating a fitting groove and a fitting protrusion.

FIG. 6 is a view illustrating a fitting groove and a fitting protrusion.

Referring to FIG. 6, a fitting groove 210 and fitting protrusions 113 and 123 may be provided to increase a binding force between the insulator 100 and the stator 200.

The fitting groove 210 may be concavely formed at the teeth of the stator 200, and may be disposed in a height direction of the stator 200. And the fitting protrusions 113 and 123 may be formed to protrude from each of an inner surface of the first side wall portion 110 and an inner surface of the second side wall portion 120, and may be slidably fitted to the fitting groove 210.

According to the embodiment, since the insulator is formed in the single part, and the clip portion is provided to be fitted to the teeth of the stator, assemblability of the insulator with the stator can be ensured, and a manufacturing cost and a manufacturing time can be reduced.

According to the embodiment, since the fitting groove is formed at the teeth of the stator, and the fitting protrusion which is inserted into the fitting groove is formed at the insulator, the binding force between the stator and the insulator can be increased.

Until now, the insulator according to one embodiment of the present invention and the motor having the same have been described in detail with reference to the accompanying drawings.

The description proposed herein is just a preferable example for the purpose of illustrations only, and various modifications, changes or substitutions in the present invention can be realized by one of ordinary skill in the art to which this invention belongs without departing from the essential characteristics of the present invention. Therefore, the embodiments and the accompanying drawings disclosed in the present invention have been described for illustrative purposes, and the present invention is limited only by the following claims.

What is claimed is:

1. An insulator of a motor, comprising:
a first side wall portion and a second side wall portion in which a coil is wound on outsides thereof, and which are disposed to face each other, to form an accommodation space at insides thereof, and also to form an entrance portion through which a stator is inserted;
a connecting portion integrally formed with the first side wall portion and the second side wall portion; and
a clip portion formed to protrude from at least one of an end of the first side wall portion and an end of the second side wall portion, and disposed at the entrance portion.

2. The insulator of claim 1, wherein the clip portion is formed to protrude toward the inside of the first side wall portion or the inside of the second side wall portion, and comprises a stepped surface which is in contact with an upper surface or a lower surface of the stator.

3. The insulator of claim 2, wherein the stepped surface is formed horizontally.

4. The insulator of claim 3, wherein the clip portion comprises an inclined surface which guides an insertion of the stator.

5. The insulator of claim 4, wherein a first coil seating groove is concavely formed at a winding surface formed at a surface of the first side wall portion and a winding surface formed at a surface of the second side wall portion so that the coil is seated on the first coil seating groove.

6. The insulator of claim 5, wherein the clip portion comprises a second coil seating groove which is formed to be continued with the first coil seating groove.

7. The insulator of claim 1, wherein the connecting portion is formed at an upper end of the first side wall portion and an upper end of the second side wall portion, and the entrance portion is formed at a lower end of the first side wall portion and a lower end of the second side wall portion.

8. The insulator of claim 7, further comprising an inner wall portion and an outer wall portion,
wherein the inner wall portion is formed inside the upper end of the first side wall portion and the upper end of the second side wall portion, and the outer wall portion is formed outside the upper end of the first side wall portion and the upper end of the second side wall portion.

9. A motor comprising:

a rotating shaft;

a rotor configured to surround the rotating shaft; and a stator disposed outside the rotor, wherein the stator comprises a coil and an insulator on which the coil is wound, and the insulator comprises a first side wall portion and a second side wall portion disposed to face each other, to form an accommodation space surrounding the stator, and also to form an entrance portion through which the stator is inserted, a connecting portion integrally formed with the first side wall portion and the second side wall portion, and a clip portion formed to protrude from at least one of an end of the first side wall portion and an end of the second side wall portion, and disposed at the entrance portion.

10. The motor of claim 9, wherein the stator comprises a fitting groove which is formed at each of teeth and disposed in a height direction thereof, and a fitting protrusion which protrudes convexly and is fitted to and inserted into the fitting groove is formed at at least one of an inner surface of the first side wall portion and an inner surface of the second side wall portion.

11. The motor of claim 9, wherein the clip portion is formed to protrude toward an inside of the first side wall portion or an inside of the second side wall portion, and comprises a stepped surface which is in contact with an upper surface or a lower surface of the stator.

12. The motor of claim 9, wherein the clip portion comprises an inclined surface which guides an insertion of the stator.

13. The motor of claim 9, wherein a first coil seating groove is concavely formed at a winding surface formed at a surface of the first side wall portion and a winding surface formed at a surface of the second side wall portion so that the coil is seated on the first coil seating groove.

14. The motor of claim 13, wherein the clip portion comprises a second coil seating groove which is formed to be continued with the first coil seating groove.

* * * * *